Patented Jan. 9, 1923.

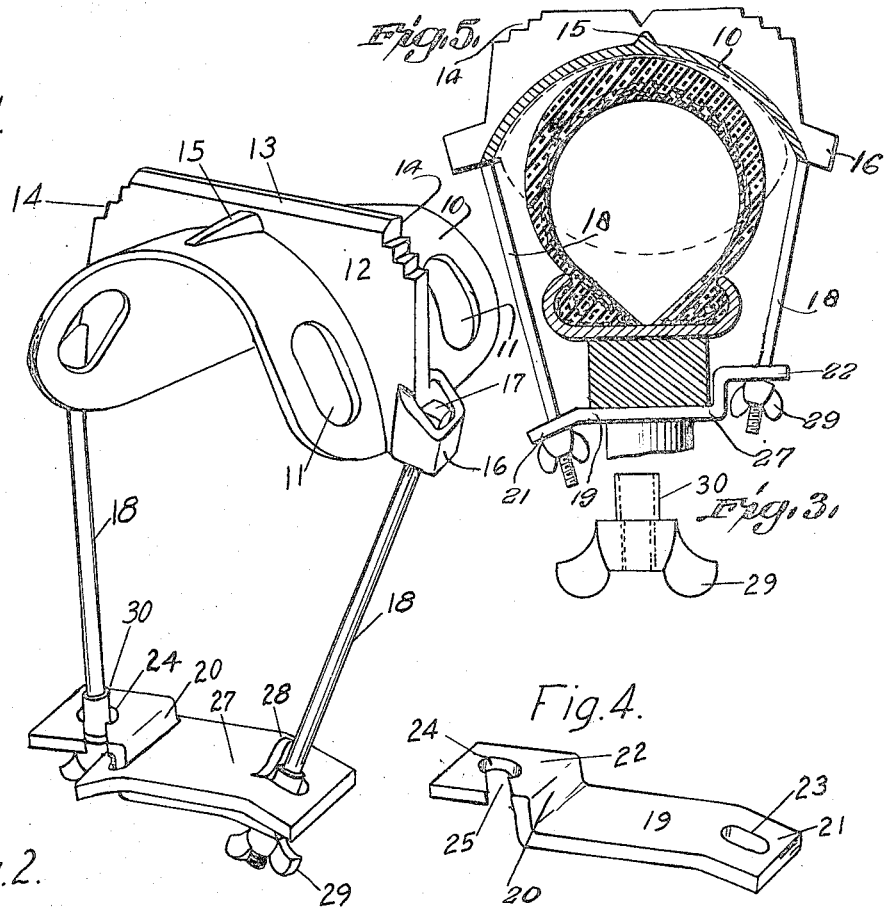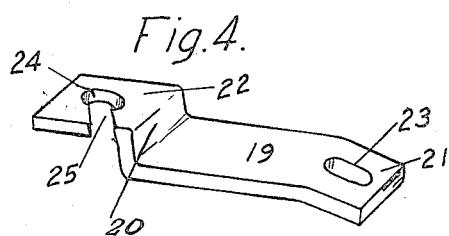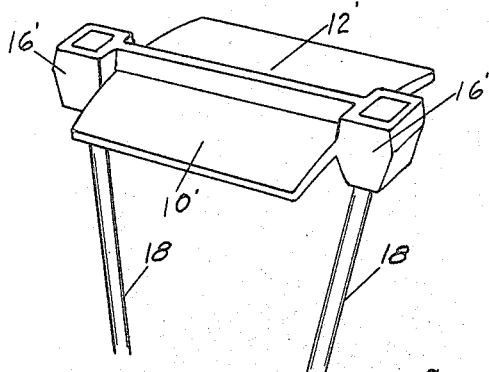

1,441,198

UNITED STATES PATENT OFFICE.

GEORGE FRANCIS ABBOTT AND CHARLES ALLEN SANDS, OF LINCOLN, NEBRASKA, ASSIGNORS OF TEN PER CENT TO SAID ABBOTT, TWENTY-SEVEN AND ONE-HALF PER CENT TO SAID SANDS, AND SIXTY-TWO AND ONE-HALF PER CENT TO EUGENE GRAVES, OF LINCOLN, NEBRASKA.

MUD LUG.

Application filed September 15, 1921. Serial No. 500,994.

*To all whom it may concern:*

Be it known that we, GEORGE FRANCIS ABBOTT and CHARLES ALLEN SANDS, citizens of the United States, residing at Lincoln, in the county of Lancaster and State of Nebraska, have invented certain new and useful Improvements in Mud Lugs, of which the following is a specification.

In the various types of self propelled vehicles, great difficulty is frequently encountered when the road is slippery from mud, snow, or rain, which reduces the friction between the wheel and the road material to a point where the wheels instead of propelling the vehicle, will spin but remain stationary in position. The power of the engine is thus wasted in wearing out the gears, bearings, and tires. To overcome this difficulty, various devices have been employed to temporarily increase the friction, and some of these have come into extensive use, but they have all without exception been open to serious objections. The object of our invention is to provide a mud lug which with its securing means will be free from all known objections, and which will be of a type which is adaptable to solid as well as to pnumatic tires, or in fact to the surface of any propelling wheel.

In the drawings,

Figure 1 shows in perspective the preferred form of our mud guard as adapted for use with a pneumatic tire wheel, the securing means being shown in their relation to the lug when the lug is in position.

Figure 2 shows a modification of the mud lug as adapted for use with a solid tire wheel.

Figure 3 is a detail view of the wing nut and collar, more fully described hereinafter.

Figure 4 shows the spacing bar which is part of the securing means, and which is an essential feature of our invention.

Figure 5 is a transverse sectional view of our mud lug in place on the tire.

In the drawings, numeral 10 indicates a cap or plate which is adapted to fit the contour of the tire. For this purpose it is slightly rounded from end to end to conform to the outer circumference of the tire, and is elliptically curved from side to side, the outer edges being further distant from the center of curvature than the inner portion. The reason for this curvature is that the tire tends under pressure at the point of contact to assume an elliptical shape, and our efforts are directed toward producing a plate which will have the shape of the tire when the lug is functioning. The plate is made relatively large in both dimensions. It extends approximately half way around the transverse circumference of the tire, thus preventing the possibility of the edges of the plate cutting into the tire. Holes 11 may be punched or cut in the plate to reduce the weight.

Secured to the plate is the lug 12. It is our purpose to cast the lug integral with the plate, but the two may be welded or secured together by means of screws or any other known fastening means. The lug 11 is preferably positioned nearer the front end than the rear end of the plate 10, since there is a tendency in lugs of this type for the plate to tilt and dig its rear end into the tire whenever the lug strikes an unyielding surface. The rear end of our plate being relatively long, the liability of damage to the tire is practically eliminated.

The lug 12 is bevelled at its forward edge 13. Notches 14 are cut at the two corners of the lug. On the forward side of the lug and integral with both the lug and the plate, is a rounded wedge-shaped brace 15 which serves primarily to prevent lateral skidding. The brace however has another important function in reducing the shock when the lug strikes a partially yielding substance. The brace 15 cooperates with the bevelled edge 13 to result in a gradually progressive pressure until the lug is vertical in position. The shock may be still further reduced by cutting a notch in the lug 12 to the rear of the brace 15. The lug will sink to various depths depending on the consistency of the surface over which it travels, and the steps 14 facilitate the finding of a proper footing, besides cooperating with the brace 15 to prevent skidding.

The lug is provided with ears 16 on opposite sides of the plate and near the lowest portions thereof. Both of these ears are hollowed out for the reception of the square heads 17 of bolts 18. The ear which is on the outside of the wheel is so positioned that when the bolt head finds its seat, the bolt will be substantially parallel with the plane of the wheel, but the ear which is on the inside of the wheel or next to the body of the car, is inwardly and centrally inclined to give a sharp inward and central inclination to the bolt. The bolt swings freely when unsecured at its lower end.

The specially designed spacing bar shown in Figure 4 serves to rigidly connect the lug to the tire. The bar consists of a main portion 19 whose length is substantially that of the width of the felloe. The portion 20 is bent at an angle to the part 19, and the end portion 22 is bent into a plane parallel to the plane of the part 19. At the opposite end of the spacing bar, portion 21 is bent into the direction opposite to that of the part 20, the inclination of the part 20 with reference to the part 19 being such that the ear 16 will be substantially parallel with the portion 21 when the mud lug is in place. The portion 22 is provided with an aperture 24 and the portion 21 has an aperture 23, the apertures 23 and 24 being designed for the reception of the bolts 18. Aperture 23 is elongated and aperture 24 is provided with a slot 25 extending to the lateral edge of the bar, the edges of the slot being slightly bevelled. A pad 27 of leather, felt, rubber or any other suitable material is provided with a slot fitting over the portion 20 of the bar, and with an aperture corresponding with the aperture 23. The aperture in the pad has a tongue 28 which bears against the bolt 18.

The free ends of the bolts 18 are screw threaded for the reception of nuts. Any type of nut may be used in this connection, but for convenience we prefer to use wing nuts 29. Collars 30 protect the threads against wear from the hard usage to which they are subjected. The collars and nuts may be separate elements, but we have designed an integral nut and collar as shown in Figure 3. This form by reason of the fact that there is one less piece to handle, has been found to be more convenient than when the two are separate. It has the further advantage that the collar is not liable to longitudinal displacement from vibrations due to the motions of the car. The collar has substantially the same diameter as that of the aperture but is larger than that of the slot, thus preventing accidental displacement of the bolt through the slot. The threads are cut high enough on the bolts to make possible the adjustment to wheels of any of the sizes in use on trucks and automobiles.

The lugs are made in pairs, the only difference being in the position of the relative positions of the two ears 16, so that the inclined ear will be on the inside of the wheel. All other parts are interchangeable. The entire device may be disassembled and thus carried in the tool box, or it may be carried in its assembled form as shown in Figure 1. The position of the outside nut having been once determined by the owner for his particular car, there is no need of disturbing the adjustment or of further turning that nut except to occasionally tighten it immediately after applying the lug to the wheel. When it is desired to apply the lug to the wheel, the bolt 18 is slipped through the slot 25 and the plate 10 is seated on the tire, after which the nuts 29 are tightened to firmly secure the lug to the wheel. It should be noted that after the plate has been placed on the tire, the inside bolt 18 will hang freely in a vertical position between the car and the wheel, and the bar 27 by virtue of its bent end 21 will hang perpendicularly and in alignment with its bolt. This facilitates easy handling and makes possible the quick assemblage. The bent end 21 of the bar 19 has still another function. Because of the bent end, the wing nut between the car and the wheel is almost between the spokes and directed outwardly, thus making it possible to tighten the nut by simply putting the fingers through between the spokes.

The inclined position of the inside bolt avoids any interference with the brake mechanism of the car. In some cars the brake is within an inch and a half or two inches of the wheel, but our lug because of its novel features will clear the brake of any car on the market. The central or main portion 19 of the spacing bar will accommodate the felloes of most automobile wheels. the part 20 being set flush with the edge of the felloe. Sometimes a wider felloe is found and in such cases the elongated aperture 23 comes into play. Regardless of the position of the bolt in the aperture 23, the wing nut will turn firmly against the under side of the bent portion 21.

In Figure 2 we have shown a modification of our mud lug as adapted for use on a solid tire such as are frequently used on trucks. A plate 10' of a width approximately equal to that of the tire and conforming to the curvature of the tire, is provided with a lug or gripper portion 12', as shown in Figure 2.

The two ears 15' in the form shown in Figure 2 are integral with the plate and gripper, and as in the form shown in Figure 1, the ear 15' which is next to the truck body is positioned so that the bolt passing through it is inclined to the plane of the wheel while the outside bolt is parallel to the wheel. We have shown deeply set sockets in the ears for the reception of the square heads of the bolts. The bolts 17 and the fastening means are identical with the form shown in Figure 1, the only essential differences being those in the plate and gripper which are necessitated by the difference in form of the solid and pneumatic tires.

Having fully described our invention and the method of using it, what we desire to protect by Letters Patent of the United States is:—

1. A mud lug comprising a plate which is adapted to rest on the outer surface of a tire, a projection extending radially outward from the surface of said plate, said projection extending from side to side of the plate, the forward and outer edge of the projection being bevelled, steps in the outer corners of said projection, and means for securing the plate to the wheel.

2. A mud lug including a plate which is longitudinally and transversely curved, the longitudinal curvature being circular and the transverse curvature being elliptical, the major axis of the elliptical curve passing substantially through both lateral edges of the plate, means for securing said plate to the outer surface of a tire in such position that the projected minor axis of the elliptical cross section will pass through the wheel hub, said plate having an outwardly projecting transverse traction lug, the forward edge of said traction lug being bevelled, a notch in each of the two outer corners of the traction lug, and a notch intermediate the corners.

3. A mud lug comprising a plate, a projection extending radially from the surface of the plate, means connected to the outer edges of the plate for securing bolts thereto, a spacing bar adapted to bear against the felloe of a wheel, apertures in the ends of said spacing bar for the reception of the aforesaid bolts, an inclined slot extending from the edge of the spacing bar to the aperture in the outer end of the spacing bar and nuts on the outer extremities of said bolts for holding the spacing bar in contact with the felloe.

4. A mud lug comprising elements for engaging the road surface, said elements being adapted to cover a section of the tire from side to side, means for securing the said elements to a wheel, said securing means comprising a spacing bar having inclined end portion which projects toward the body of the car and toward the projected axis of the wheel, a main portion which rests against the radial side of the felloe of a wheel, an angled portion which is adapted to bear against the outer edge of the felloe, and an end portion projecting outwardly from the extremity of the angled portion and lying wholly on the side opposite the inclined portion, both of said end portions having apertures, bolts secured to said first mentioned elements and passing through the apertures in said spacing bar, and nuts on the screw threaded ends of said bolts, the nuts bearing against the spacing bar to hold the spacing bar in position against the felloe.

5. Means for attaching a device to the outer surface of a tire comprising a bar which is adapted to rest against the edge of a felloe opposite the tire, an aperture in each end of the bar, the aperture in the end which projects toward the car being elongated, the aperture in the end which projects away from the car having a slot connecting the aperture with the edge of the bar, screw-threaded means attached to each side of the device and passing through the aforesaid apertures, nuts bearing against the surface of the plates and threaded onto the screw-threaded means, and a collar surrounding the screw-threaded means which passes through the aperture in the outer end of the bar.

6. Means for attaching a device to the outer surface of a tire comprising a bar which is adapted to rest against the edge of a felloe opposite the tire, said bar having an end portion which is inclined toward the car and toward the projected axis of the wheel, an aperture in said end portion, the aperture being elongated in the direction of the length of the bar, said bar also having a main portion, an angled portion which is adapted to rest against the outer edge of the felloe, and a second end portion projecting outwardly from the angled portion, said second end portion having an aperture and a slot from the aperture to an offset point on the edge of the bar, and rods secured to the device at each side, said rods passing through the apertures in the bar.

7. Means for attaching a device to the outer surface of a tire comprising a bar which is adapted to bear against the edge of a felloe opposite the tire, said bar consisting of a main portion whose length is substantially equal to the width of a felloe, an end portion inclined toward the car and toward the projected axis of the wheel, a portion extending angularly to the main portion to a distance substantially equal to the outer lateral edge of a felloe, a second end portion projecting from the angularly extending portion, said second end portion being substantially parallel to the main portion and extending outwardly from the wheel, apertures in both of said end portions for securing the device to the tire, the aperture in the second of said end portions being provided with a slot which extends from the aperture to the edge of the bar.

In testimony whereof we affix our signatures.

GEORGE FRANCIS ABBOTT.
CHARLES ALLEN SANDS.